(12) United States Patent  (10) Patent No.: US 12,419,324 B2
Zhang et al.  (45) Date of Patent: Sep. 23, 2025

(54) METHODS FOR THE PREPARATION OF A PLANT PROTEIN COMPOSITION (71) Applicant: WHITEWAVE SERVICES INC., Broomfield, CO (US)

(72) Inventors: Huimin Zhang, Arvada, CO (US); Jonathan Gray, Arvada, CO (US); Matthew Bales, Broomfield, CO (US); Luke Chavez, Denver, CO (US); Huaixia Yin, Broomfield, CO (US)

(73) Assignee: WHITEWAVE SERVICES INC., Broomfield, CO (US)

( * ) Notice: Subject to any disclaimer, the term of this patent is extended or adjusted under 35 U.S.C. 154(b) by 839 days.

(21) Appl. No.: 17/413,272

(22) PCT Filed: Dec. 13, 2019

(86) PCT No.: PCT/US2019/066182
§ 371 (c)(1),
(2) Date: Jun. 11, 2021

(87) PCT Pub. No.: WO2020/123915
PCT Pub. Date: Jun. 18, 2020

(65) Prior Publication Data
US 2022/0015387 A1  Jan. 20, 2022

Related U.S. Application Data (60) Provisional application No. 62/779,997, filed on Dec. 14, 2018.

(51) Int. Cl.
A23J 3/14 (2006.01)
A23C 11/10 (2021.01)
A23L 11/60 (2021.01)
A23L 33/15 (2016.01)

(52) U.S. Cl.
CPC .............. *A23J 3/14* (2013.01); *A23C 11/103* (2013.01); *A23L 11/60* (2021.01); *A23L 33/15* (2016.08)

(58) Field of Classification Search
CPC ........ A23C 11/103; A23L 11/60; A23L 33/15; A23J 3/14
See application file for complete search history.

(56) References Cited

U.S. PATENT DOCUMENTS

| 4,734,287 | A | 3/1988 | Singer et al. |
| 2006/0019017 | A1 | 1/2006 | Singh et al. |
| 2007/0231453 | A1 | 10/2007 | Bovetto et al. |
| 2012/0295008 | A1 | 11/2012 | Schweizer et al. |
| 2016/0050956 | A1* | 2/2016 | Segall ..................... A23J 3/14 426/656 |

(Continued)

FOREIGN PATENT DOCUMENTS

| EP | 2272379 A1 | 1/2011 |
| EP | 2601843 A1 | 6/2013 |

(Continued)

OTHER PUBLICATIONS

International Search Report issued in PCT/US2019/066182, dated Mar. 9, 2020, pp. 1-2.

*Primary Examiner* — Jenna A Watts
(74) *Attorney, Agent, or Firm* — ArentFox Schiff LLP (57) ABSTRACT The present invention provides methods for the preparation of protein base compositions using antioxidants with heat treatment.

13 Claims, 3 Drawing Sheets (56) References Cited

U.S. PATENT DOCUMENTS

2017/0135379 A1    5/2017   Bringe
2017/0238590 A1*   8/2017   Bansal-Mutalik ...... A23J 1/148

FOREIGN PATENT DOCUMENTS

| RU | 2635375 C2 | 11/2017 |
| --- | --- | --- |
| WO | 2017120597 A1 | 7/2017 |
| WO | 2018011786 A1 | 1/2018 |
| WO | 2018224537 A1 | 12/2018 |

* cited by examiner

METHODS FOR THE PREPARATION OF A PLANT PROTEIN COMPOSITION

CROSS-REFERENCE TO RELATED APPLICATIONS

This application is a National Stage Entry of PCT/US2019/066182, filed Dec. 13, 2019, which claims priority to U.S. application No. 62/779,997, filed Dec. 14, 2018, the disclosures of each of which are hereby incorporated by reference in their entireties.

FIELD OF THE DISCLOSURE

The disclosure relates to the field of food processing and more specifically to methods for the preparation of protein base compositions using antioxidants with heat treatment such as direct ultrahigh heat treatment (UHT), in order and to produce a concentrated liquid and/or dry powder protein having good organoleptic qualities.

TECHNICAL BACKGROUND

Plant protein food and beverages are increasingly desirable to consumers with roughly 20% annual increase in consumption in recent years. Health and environmental benefits are one of the key reasons why consumers are switching towards plant-based diets. Research has linked plant-based diets with lower risks of heart disease, obesity, hypertension, Type 2 diabetes, and certain types of cancer. Additionally, plant-based diets are better for the environment.

Protein is a macronutrient used by the body for building, repairing, and maintaining tissues and for making hormones. As a result, consuming an adequate amount of protein is essential to a healthy diet. Protein obtained from a protein source can be used as an ingredient in a food product. However, incorporating added plant-based protein into a food product can present challenges in terms of flavor, taste, color, and texture. Current commercially-available plant protein powder products are challenged in meeting consumer expectations in terms of off-flavor (such as beany, green, vegetal, eggy), off-taste (such as bitter, metallic, and astringent), off-color (such as brown and orange), and off-texture such as gritty/chalky and low solubility.

While off-color and gritty texture are problems, off-notes are major challenges limiting the use of many plant based proteins in food products. In growing plant tissue, lipid enzymes and flavor precursors are compartmentalized in intact cells. However, during processing, cells are damaged and allow enzyme-substrate interaction, consequently, numerous flavor compounds can be produced by the interaction of oxidized lipids either as processing residues or in the protein-associated form. Lipoxygenase (LOX) catalyzes the hydroperoxidation of polyunsaturated fatty acids and esters containing a 1,4-pentadiene system, subsequently degraded into a variety of secondary products. Lipoxygenase enzyme is widely distributed in a great variety of plants and responsible for the generation of objectionable flavors and quality deterioration in many foods.

The production of off-flavors is a pronounced problem especially with legumes (genus Leguminosae) that contain relatively high protein content and a high degree of lipid unsaturation and lipoxygenase isoenzymes with considerable activity, thus, are particularly susceptible to oxidative degradation when processed into protein concentrates and isolates.

The most common means for isolation of pulse protein is alkaline solubilization followed by acid precipitation. A method for the isolation of pulse protein in the presence of antioxidant compounds is disclosed in WO2014/008578, which provides a method of calcium chloride solubilization of a plant protein source and subsequent acidification. However, the relatively harsh processing can impact the organoleptic and functional properties of the protein isolate.

SUMMARY OF EXEMPLARY ASPECTS OF THE DISCLOSURE

Current plant-protein isolation and concentration processes lead to low solubility and large particle size, which, in turn, results in gritty/chalky texture and sediment/phase separation. The present disclosure follows from the finding that a minimal processing of plant protein source by controlled temperature aqueous extraction, heat-treatment in the presence of antioxidants, and controlled temperature filtration limit protein denaturation, and provide a concentrated plant-protein composition having improved taste, texture, and mouthfeel.

In one aspect, the present disclosure provides a method for the preparation of protein base composition comprising: (i) extracting a composition comprising plant proteins from a source thereof, in an aqueous solution to produce an aqueous composition; (ii) heating the aqueous composition in the presence of one or more anti-oxidant compositions; and (iii) concentrating a protein containing fraction of the aqueous composition to provide a protein base composition. The concentrating may be performed by ultrafiltration or microfiltration.

The disclosure also provides compositions comprising a protein base composition comprising extracted plant proteins, as well as food products comprising the same.

The above summary of exemplary aspects serves to provide a basic understanding of the disclosure. It is understood that the individual elements of any of the disclosed methods, compositions, or food products described herein may be combined to generate still further aspects without departing from the spirit of the present disclosure.

BRIEF DESCRIPTION OF THE DRAWINGS

The accompanying drawings, which are incorporated into and constitute a part of this specification, illustrate one or more exemplary aspects of the present disclosure.

DETAILED DESCRIPTION OF EXEMPLARY ASPECTS OF THE DISCLOSURE

As used herein, the terms "protein composition," "protein base," or "protein base composition" shall be taken to mean a composition comprising at least 60% w/w total solids plant-derived protein.

Protein content is expressed as Kjeldahl Nitrogen X CF (with "CF" referring to a conversion factor of 6.25). The total solid, lipid, protein, and ash analyses may be calculated according to the AOAC standard methods AOAC 990.20, AOAC 922.06, AOAC 992.15, and AOAC 945.46.

As used herein, the term "stable composition" shall be taken to mean a composition that does not present sedimentation and/or serum separation.

As used herein, the term "x % (w/w)" is equivalent to "x g per 100 g".

As used herein, the terms "plant derived" "plant based" shall be taken to refer to a composition or product which does not contain animal or animal-derived matter (e.g. eggs or mammalian milk).

As used herein, the term "dairy" shall be taken to mean a composition or product comprises or consists of mammalian milk matter—the lacteal secretion obtainable by milking.

As used herein, the term "dairy-free" shall be taken to mean a composition or product which does not contain mammalian milk matter—the lacteal secretion obtainable by milking.

As used herein, the terms "dairy analogue" or "dairy substitute" shall be taken to mean a dairy-free food or beverage composition formulated to simulate the organoleptic and/or nutritional qualities of a dairy product.

As used herein, the term "antioxidant" shall be taken to mean a comestible substance recognized as suitable for use as a food additive by a relevant national or supranational authority (e.g., EFSA, FDA) and capable of inhibition of oxidation in a food product to prevent, delay or reduce deterioration caused by oxidation.

As used herein, the term "E3" followed by a 2 digit number shall be taken to refer to codes for substances that are permitted to be used as food additives for use within the European Union, e.g., E301 (sodium ascorbate).

Protein obtained from a protein source may be used as an ingredient in a food product, for example, to impart nutrition to the food product. However, current plant protein-based ingredients may present challenges in terms of color, flavor, taste, solubility, and particle size.

The present disclosure provides various aspects that may improve one or more of these characteristics. For example, certain aspects use antioxidants, heat-treatment and membrane filtration processes to provide a protein composition having a good flavor and texture profile.

Exemplary Methods of the Disclosure

In one aspect, the disclosure provides a method for the preparation of protein base composition comprising: (i) extracting a composition comprising plant proteins from a source thereof, in an aqueous solution to produce an aqueous composition; (ii) heating the aqueous composition to a temperature of 260° F.-300° F. in the presence of one or more anti-oxidant compounds or compositions; and (iii) concentrating a protein containing fraction of the aqueous composition to provide a protein base composition, optionally, by ultrafiltration or microfiltration.

In the first step, an aqueous solution comprising plant protein is prepared from a source thereof (hereinafter also referred to as "plant protein source"). The plant protein source may be any suitable plant matter or any suitable edible plant substance known in the art may be used, preferably selected from the group consisting of legumes, nuts, seeds, grain and combinations thereof. It is particularly preferred that the plant protein source comprises or consists of a legume, and most preferably, pulse or pulses. In some aspects, it is preferred that the plant protein matter does not contain animal, soy, gluten, dairy matter and/or combinations thereof. In another aspect, the legumes are peas, peanuts, lentils, beans or combinations thereof. In one embodiment, said legumes are selected from the group consisting of pea, peanuts, lentils, beans and combinations thereof.

Particularly preferred plant protein sources include pulses. Particularly preferred are pulses selected from the group consisting of lentils, chickpeas, peas, beans and/or combinations thereof. Most preferred are pulses selected from the group consisting of split peas, field peas, dry peas, lentil, chickpeas, garbanzo bean, konda, navy bean, white navy bean, white pea bean, pea bean, cow pea, horse bean, haricot, pinot bean, mottled bean, small red bean, red Mexican bean, kidney bean, black bean, black turtle bean, cranberry bean, roman bean, speckled sugar bean, lima bean, haba bean, Madagascar bean, green gram, mung bean, green bean, black gram, urad dal and/or lupin. Most preferred are pea (preferably *Pisum sativum*) and/or chickpea (*Cicer arietinum*).

In certain embodiments, said nuts are selected from the group consisting of almonds, cashews, pecans, macadamias, hazelnuts or walnuts and combinations thereof.

In a further embodiment, said seeds are selected from the group consisting of hemp, pumpkin, quinoa, lupines, sesame, pumpkin, tiger nut, flax, chia, sunflower, coconut, and combinations thereof.

In a further embodiment, said grains are selected from the group consisting of wheat, rye, spelt, rice, barley, oat, and combinations thereof.

The plant protein source may be plant matter, processed plant matter or by-products thereof provided they comprise protein. In other aspects, the plant matter are ground plant matter, such as ground pulses or pulse flours which are unhulled, partially hulled, or dehulled.

In a particular aspect, the ground plant matter is dehulled. Methods for dehulling include the use of attrition style dehullers and abrasive dehullers.

In particular aspects, the ground plant matter is a protein rich fraction. Methods for the isolation of a protein rich fragment from ground plant matter include air classification or wet extraction.

In some aspects, the ground plant matter is a defatted matter, such as defatted pumpkin seed flour.

In other aspects, the particle size of the ground plant matter is relatively low (preferably such that would not damage starch granules), and that the particle size distribution is relatively uniform.

Accordingly, in some aspects, the plant protein source is air-classified dehulled ground pulse matter, such as ground peas and/or chickpeas.

The plant protein source is combined with water to provide an aqueous suspension or slurry (hereinafter also referred to as "aqueous composition").

In some aspects, the plant protein source is combined with water in an amount of 1 to 1 to 1 to 100 w/w ratio plant protein source to water, 1 to 5 to 1 to 50 w/w ratio plant protein source to water, or 1 to 5 to 1 to 15 w/w ratio plant protein source to water.

Methods for the preparation of such suspensions or slurries typically comprise mechanical disruption of the plant matter and hydration and/or combination with a solution, followed by separation of a protein rich fraction from starchy and/or fibrous matter, e.g., by centrifugation or filtration. For example, the plant protein source may be milled, ground, soaked, dehulled, mixed with water, etc. in order to produce a suitable aqueous composition.

Optionally, calcium salts may be provided to the aqueous composition to aid solubilization of the protein fraction of the plant protein source. However, in some aspects, it is the methods described herein are performed without the addition of calcium salts. Thus, in some exemplary aspects, methods according to the disclosure may be performed using components and/or solutions contain no calcium salts and/or which contain no additional calcium salts (e.g., beyond those naturally present in the plant protein source that is being processed).

The first step of the method is preferably carried out at a temperature of not more than 100° F., preferably not more than 85° F.

In one embodiment, of the method an antioxidant composition is combined with the plant protein source prior to, during or subsequent to incorporation with water.

In various embodiments, the antioxidant composition is of synthetic origin. In alternative embodiments, the antioxidant composition is of natural origin.

In various embodiments, the antioxidant composition is one or more antioxidant food additives selected from the group consisting of E300-E399, preferably vitamin compositions and/or of natural origin.

In some aspects, the antioxidant composition is vitamin E compositions, Vitamin C compositions, catechin, genistein, and 1,3,5-trihydroxybenzene, small quantities of ascorbic acid, tanic acid, gallic acid, synthetic antioxidants such as butylated hydroxyanisol (BHA) and butylated hydroxytoluene (BHT), emerging antioxidants such as thymol, carvacrol, 6-gingerol, hydroxytyrosol and zingerone as well as vegetal antioxidant extracts (e.g. beta carotene, rosemary and mauqi berry), or combinations thereof.

In particular aspects, the antioxidant composition is a comestible antioxidant vitamin (E, C) or a salt thereof. In particular aspects, the antioxidant vitamin is Vitamin C and/or Vitamin E.

In some aspects, the antioxidant composition is a composition comprising or consisting of Vitamin C or its salts or esters, such as ascorbic acid, sodium ascorbate, calcium ascorbate, potassium ascorbate, or combinations thereof.

In various embodiments, the antioxidant composition is a composition comprising or consisting of Vitamin E, preferably selected from the group consisting of alpha-tocopherol, beta-tocopherol, gamma-tocopherol, delta-tocopherol, alpha-tocotrienol, beta-tocotrienol, gamma-tocotrienol, delta-tocotrienol and combinations thereof.

In a particularly preferred embodiment of the method, at least two antioxidant types are combined with the plant matter: (a) a first antioxidant type which are one or more water soluble antioxidant compositions; and (b) a second antioxidant type which are one or more lipid soluble antioxidant compositions.

Accordingly, in one embodiment, the present invention provides a method of the invention comprising the addition of: (a) Vitamin C or its salts or esters, preferably selected from the group consisting of ascorbic acid, sodium ascorbate, calcium ascorbate, potassium ascorbate, and/or combinations thereof, and (b) Vitamin E, preferably selected from the group consisting of alpha-tocopherol, beta-tocopherol, gamma-tocopherol, delta-tocopherol, alpha-tocotrienol, beta-tocotrienol, gamma-tocotrienol, delta-tocotrienol and/or combinations thereof.

Preferably, the anti-oxidant composition is provided in 1%-0.01% w/w of the total aqueous composition, 0.5%-0.01% w/w, or 0.1%-0.01% w/w of the total aqueous composition.

In one embodiment water soluble antioxidant compositions are provided in 0.5%-0.01% w/w or 0.1%-0.01% of the total aqueous composition. In an additional embodiment lipid soluble antioxidant compositions are provided in 0.5%-0.01% w/w or 0.1%-0.01% of the total aqueous composition.

In a most preferred embodiment, both water-soluble and lipid-soluble antioxidant compositions are combined into the aqueous composition in an amount of 0.5%-0.01% w/w or 0.1%-0.01% of the total aqueous composition for each antioxidant type.

Accordingly, in said embodiment the method of the invention provides the incorporation of a Vitamin E composition and a Vitamin C composition in an amount of 0.5%-0.01% w/w or 0.1%-0.01% w/w of the total aqueous composition for each vitamin (e.g., 0.1% w/w Vitamin C and 0.05% w/w Vitamin E).

Preferably, the pH of the aqueous composition comprising antioxidants is maintained between 6-8, more preferably 6.5-7.5. It is preferred that the pH of the antioxidant composition is such that the pH of the aqueous composition is maintained in the range of between 6-8, more preferably 6.5-7.5.

Prior to the second step of the method, insoluble plant protein matter may be removed from the aqueous composition. Methods for the separation of insoluble fibrous materials include, e.g., filtering, decentering, and centrifugation.

In the second step of the method, the aqueous composition is heat treated to a temperature of 260° F.-300° F. The heat treatment is preferably carried out for 1 second-5 minutes, 1 second-1 minute, or 1-20 seconds (e.g., 2-8 seconds). The heat treatment may be carried out by heating and cooling to a successive range of temperatures and maintaining at pre-determined temperatures for a specified amount of time (e.g., preheating to 178° F. then heating to 292° F. maintaining for 3 seconds followed by cooling to 173° F.). The heat treatment may be carried out by any means known in the art. In some aspects, the heat treatment is carried out by ultra-high temperature (UHT). UHT treatment methods are known to the person skilled in the art.

Ultra-high-temperature (UHT) is a process at a combination of times and temperatures in the ranges of 260° F.-300° F., for at least 2-8 s to produce "commercially sterile" liquid products. There are direct and indirect UHT. In a particular aspect, direct steam injection/infusion may be used to achieve a rapid increase in temperature and quickly cool down liquid. In another particular aspect, direct UHT may be used—the sudden decrease in temperature of direct UHT creates a vacuum, and the vacuum flashing causes removal of the injected steam and other gases such as oxygen and off-flavor volatile compounds.

UHT can rapidly inactivate LOX in addition to inactivate anti-nutritional factors such as trypsin inhibitor activity (TIA). While UHT technology offers many advantages, it also causes chemical changes that can be manifested in noticeable negative changes in flavor and color profile. The negative flavor changes in UHT milk and particularly cooked flavor developed during heat treatment have been associated with the lipid oxidation and Maillard reaction. For further reduction of the off-flavor and off-color produced during UHT process, antioxidants are needed. The combination of antioxidants with UHT aims to further reduce off note and off color in addition to preventing spoilage and ensure food safety.

In the third step of the method, a protein containing fraction is isolated from the aqueous composition to provide the protein base composition. In embodiments the isolation provides a protein containing fraction having 60%, 65%, 70% or higher w/w protein content. In other aspects, the isolation provides a protein containing fraction having at least 2 or 3 times higher w/w total solids content than the aqueous slurry.

In some aspects, the isolation of the protein containing fraction is carried out by membrane filtration. Membrane filtration technology uses one or more porous membrane filters to separate particles in a fluid. Particles may be separated on the basis of their size and shape with the application of a pressure differential across the membrane. Specially designed membranes with different pore sizes may be used to target the separation of different particles. Additionally, pressure and temperature may be adjusted within or near the membrane filters to facilitate the separation of target particles.

Membrane filtration technology, specifically ultrafiltration (UF), can reduce simple compounds like saponins and tannins that cause off-taste while concentrating protein. Tannins, the water-soluble polymeric phenolics with relatively high molecular weight, are compounds responsible for the astringency of many foods and beverages. Saponins are non-volatile, amphiphilic compounds that occur in a wide variety of legume seeds such as peas, chickpea, lentils and lupins. They are chemically referred to as triterpene glycosides, consist of non-polar aglycones coupled with one or more sugar chains, and grouped phenomenologically by the soap-like foam they produce when shaken in aqueous solutions. The bitterness has been ascribed to saponins, and the bitterness perceived correlated with saponin concentration.

In certain aspects, the aqueous composition is filtered through an ultrafiltration (UF) membrane having a maximum pore diameter between 0.1 and 0.001 microns. In particular aspects, filtering the aqueous composition with an ultrafiltration membrane includes filtering the aqueous composition until the aqueous composition comprises less than 0.5 g/kg of saponins, less than 0.5% tannins, and less than 1.5 g/kg phytate. The reduction of saponins, xanthophyll, tannins, and phytate may improve the flavor and increase the stability of the protein ingredient.

In certain embodiments, the aqueous composition is filtered through a microfiltration (MF) membrane having a maximum pore diameter between 0.1 and 0.5 microns, more preferably 0.1 to 0.22 microns.

Certain materials may be more effective in filtering various components from the aqueous composition. In certain aspects, the aqueous composition may be filtered through membrane filters including spiral wound poly ether sulfone.

The protein base composition may be further dried or spray-dried to provide a high protein dried protein base composition. In particular aspects, the aqueous composition is processed by drying the aqueous composition. Drying may include any suitable techniques for decreasing the moisture content of a solution or slurry. In certain aspects, the aqueous composition is spray-dried in order to form a dried protein base composition. Drying the aqueous composition may produce a concentrated protein product that is easily transported. The third step of the method is preferably carried out at a temperature of not more than 100° F. or not more than 85° F. During all steps of the method, the pH of the aqueous composition is maintained between 6-8 or 6.5-7.5.

The aqueous or dried protein base composition is formulated with further comestible ingredients to provide a food or beverage composition.

Exemplary Compositions According to the Disclosure

In a second aspect, the disclosure provides a protein base composition obtainable according to the methods described herein. The protein base composition preferably comprises between 60% and 90% w/w protein over total solids or between 75% and 85% w/w total solids protein. The plant protein composition of the disclosure may be a plant protein concentrate or isolate, as determined by their % w/w total solids protein.

The protein base composition preferably has a particle size distribution having at least 80%, 85%, 90%, 95% or more particles having a maximum dimension equal to or less than 1 μm. It is further preferred that the plant protein composition has a particle size distribution having at least 90%, 95%, 99% or more particles having a maximum dimension equal to or less than 10 μm.

The protein base composition according to embodiments of the present invention preferably has a hexanal content of 100 ppb, 95 ppb, 90 ppb, 85 ppb, 80 ppb, 75 ppb, 70 ppb, 65 ppb, 60 ppb, 55 ppb, 50 ppb, 45 ppb, 40 ppb, or less.

The protein base composition according to embodiments of the present invention preferably has a Hunter "Lab" value of L=75 or more (more preferably L=80 or more) and/or a=2 or less (more preferably 1.5 or less).

The protein base composition may be in powdered, spray dried, suspension, slurry or liquid form. Particularly preferred is an aqueous suspension or slurry.

The plant protein may be derived from any suitable plant matter, any suitable edible plant substance known in the art may be used, preferably selected from the group consisting of legumes, nuts, seeds, grain and/or combinations thereof. It is particularly preferred that the plant protein source comprises or consists of legume, most preferably pulse or pulses. It is preferred that the plant protein matter does not contain animal, soy, gluten, dairy matter and/or combinations thereof.

In one embodiment, said legumes are selected from the group consisting of pea, peanuts, lentils, beans and/or combinations thereof.

Particularly preferred are pulses. Particularly preferred are pulses selected from the group consisting of lentils, chickpeas, peas, beans and/or combinations thereof. Most preferred are pulses selected from the group consisting of yellow peas, green peas, split peas, field peas, dry peas, lentil, chickpeas/garbanzo bean, konda, navy bean, white navy bean, white pea bean, pea bean, cow pea, horse bean, haricot, pinot bean, mottled bean, small red bean, red Mexican bean, kidney bean, black bean, black turtle bean, cranberry bean, roman bean, speckled sugar bean, lima bean, haba bean, Madagascar bean, green gram, mung bean, green bean, black gram, urad dal and lupin. Most preferred are pea and/or chickpea.

In certain embodiments, said nuts are selected from the group consisting of almonds, cashews, pecans, macadamias, hazelnuts or walnuts and/or combinations thereof.

In a further embodiment, said seeds are selected from the group consisting of hemp, pumpkin, quinoa, lupines, sesame, pumpkin, tiger nut, flax, chia, sunflower, coconut, and/or combinations thereof.

In a further embodiment, said grains are selected from the group consisting of wheat, rye, spelt, rice, barley, oat, and/or combinations thereof.

The protein base composition according to embodiments of the present invention is preferably free of animal, soy, gluten, dairy matter and/or combinations thereof.

Exemplary Food Products According to the Disclosure

The protein base composition of the invention is useful in preparing protein enriched food and beverage products. Thus, in a third aspect the present invention provides a food or beverage composition comprising protein base composition of the invention (hereinafter referred to as "product").

In various embodiments, the product comprises 0.1-20.0% w/w protein base composition of the invention, preferably, 0.1-15.0% w/w, or 5.0-15.0% w/w. In embodiments the product comprises 0.8-16.0% w/w protein content, 0.8-12.0% w/w, or 4.0-12.0% w/w.

In various embodiments, the product of the invention has a hexanal content of 40 ppb, 35 ppb, 30 ppb, 25 ppb, 20 ppb, 15 ppb, 12 ppb, or less. In embodiments the product of the invention has a Hunter "Lab" value of L=84 or more and/or a=0.5 or less (more preferably 1.5 or less).

In various embodiments, the product of the invention may comprise sugars and sweeteners. Sugars and sweeteners are food-acceptable carbohydrate sweetening agents that may be natural or artificial, no or low calorie sweeteners; preferred examples of appropriate sugars are sucrose, fructose, lactose, glucose and maltose, wherein such sugars can be incorporated in the form of beet sugar, cane sugar, maple sugar, molasses, corn syrup, malt syrup, maple syrup, agave nectar or also honey; preferred examples of appropriate no or low calorie sweeteners are aspartame, sucralose, acesulfame potassium, saccharin, sodium cyclamate, thaumatin, tagatose, neohesperidin dihydrochalcone, isomaltulose, rebaudioside A or also a stevia extract (containing rebaudioside A).

In various embodiments, the product of the invention may comprise vitamins (e.g. vitamin A, B1, B2, B6, B12, C, D, E or K, folic acid, etc.), salts, anti-oxidants, pH-modifying agents (e.g. buffering agents or acidifying agents such as citric acid and its salts, e.g. sodium, potassium or calcium citrate), lipids (e.g. vegetable oils), preservatives (e.g., sorbic acid and its salts such as sodium, potassium and calcium salts, sulphur dioxide, benzoic acid and its salts such as sodium, potassium and calcium salts, ethyl, methyl or propyl p-hydroxybenzoate, etc.), taste exhausters (e.g., glutamic acid and its salts such as sodium, potassium, calcium, magnesium or ammonium salts), or any combinations thereof.

In various embodiments, the product of the invention may comprise texturizing agents: texturizing agents are used to modify the overall texture or mouthfeel of a food product and include gelling agents (e.g. gelatine, agar, carrageenan, pectin, natural gums), stabilisers (e.g. starch, agar, pectin, Arabic gum, gelatin), emulsifiers (e.g. lecithin, mono- and di-glycerides of fatty acids (E471), esters of mono- and di-glycerides of fatty acid (E472a-f)), and thickeners (e.g. guar gum, xanthan gum, pectin, starch, agar, carrageenan, alginic acid).

In various embodiments, the product of the invention may comprise aromatic flavouring agents of synthetic or natural origin (e.g. fruit flavours), and/or colouring agents (pigments, dyes, etc.).

In various embodiments, the product of the invention is selected from frozen dessert, sport drink, enhanced fruit and vegetable juice, smoothie, snack food, bakery product, nutritional RTM powder product, sport/nutritional bar, nutritional tea, nutritional coffee, meats, nut-based, butter and whipped topping.

Particularly preferred are plant-based dairy analogue or dairy substitute products selected from the group consisting of milk, cream, milk powder, yogurt, cheese, coffee creamer, butter and whipped topping. Most preferred are plant-based milks, such as pulse milks.

Methods for the preparation of such beverages are known in the art and typically comprise the incorporation of plant-based matter (e.g. oat syrup, almond butter) with water, emulsifiers, stabilizing and flavouring agents.

In various embodiments, the product of the invention does not contain animal, soy, gluten, dairy matter and/or combinations thereof.

EXAMPLES

The various aspects disclosed herein will be further illustrated by the following non-limiting examples:

Example 1: Preparation of a Protein Base

Ground pea was mixed to a slurry with cold water (4-10° C.) at the weight ratio of 1 to 10. To facilitate instant dispersion of the antioxidants Pronova sodium ascorbate at concentration of 0.1% (w/w) and DSM vitamin E blend of alpha, gamma, beta, delta tocopherols at concentration of 0.05% (w/w), were directly mixed with the ground pea. After the dry materials and water were mixed well and decentered twice using a Robatel decanter at flow rate 5 gpm, the first decentering was set at 1500 rpm to remove crude fiber and partially starch, and the second decentering was set at 3000 rpm to remove residual starch. The purified pea protein slurry was then heat treated by means of a MicroThermics direct UHT processing unit (preheat temperature 178° F., pasteurization temp at 292° F., hold 3 seconds, Flash temp 173° F.). The UHT slurry was then ultrafiltered (UF) using a 10 KDa pore size filter KMS filtration equipment. The UF UHT slurry is also referred to as the protein base composition.

Table 1 below shows the chemical composition of the original pea slurry and concentrated liquid pea protein base (UF retentate) using the KMS bench top filtration unit. The total solid, lipid, protein, and ash analyses followed the AOAC standard methods AOAC 990.20, AOAC 922.06, AOAC 992.15, and AOAC 945.46 respectively. Carbohydrate content was obtained by subtraction.

TABLE 1

Chemical Composition of Original Pea Slurry and Concentrated Protein Base.

| | Total Solid (TS %) | Lipid (%) | Protein (%) | Ash (%) | Carbohydrate (CHO %) | Protein/ TS (%) | CHO/ TS (%) |
|---|---|---|---|---|---|---|---|
| Pea Slurry | 2.92 | 0.13 | 1.56 | 0.23 | 1.00 | 53.4 | 34.2 |
| Protein base composition | 7.22 | 0.63 | 5.73 | 0.38 | 0.48 | 79.4 | 6.6 |

Example 2: Effect Comparison of UHT with and without Antioxidants on Off-Flavor

To illustrate the effect of UHT with vitamin antioxidants, the following trial was done. Commercially available pea protein product A, was chosen as control due to high organoleptic acceptability in consumer testing. The product is a pea protein isolate powder having 80% w/w total solids protein content.

Treatment A: Control pea-protein powder+water to make 10% total solid slurry

Treatment B: Ground pea was mixed to a slurry with cold water (4-10° C.) at the weight ratio of 1 to 10. No antioxidant powders added. After the dry materials and water were mixed well and decentered twice using a Robatel decanter at flow rate ~5 gpm, the first decentering was set at 1500 rpm to remove crude fiber and partially starch, and the second decentering was set at 3000 rpm to remove residual starch. The purified pea protein slurry was then heat treated by means of a MicroThermics direct UHT processing unit (preheat temperature 178° F., pasteurization temp at 292° F., hold 3 seconds, Flash temp 173° F.).

Treatment C: Concentrated Protein Base prepared according to Example 1.

Results:

Hexanal was used as an off-flavor compound marker, its content was obtained by Head Space Solid Phase MicroExtraction Gas Chromatography Mass Spectrometry (HS-SPME GC-MS). Specifically, all injections were made on an Agilent 7820 GC with 5975 MSD with a ZB-5 ms (30 m×0.25 mm ID×0.25 µm) column. Sample introduction was accomplished using a CTC Analytics CombiPal Autosampler. Five (5) ml of sample was added to 20 ml SPME vials in triplicate. Vials were equilibrated for 25 min at 40° C. with 4 second pulsed 250 rpm agitation. 20 ul of internal standard (Deuterated hexanal) was added to each vial for hexanal analysis. A single DVB/Carboxen/PDMS 1 cm fiber was used for all analysis. The SPME fiber was exposed to the samples for 40 min at depth 3.1 cm. The fiber was retracted and injected at 5.0 cm in the GC inlet for 5 minutes.

Table 2 below shows the hexanal (off-flavor marker compound) comparison of protein slurry with (Treatment C) and without (Treatment B) the addition of antioxidants and UHT treatment as compared to vendor pea protein product (Treatment A).

The results showed significant reduction of the off-flavor marker compound hexanal via the combination of UHT and antioxidants (treatment C) as compared with direct UHT alone (treatment B). Also, at similar total solid level and 80% protein concentration as control (treatment A), the invention pea protein base (treatment C) had significantly less hexanal content than the external commercial pea protein A.

TABLE 2

Hexanal Content (ppb) Comparison of UHT Pea Protein Slurry With vs Without Antioxidants.

| | A. Commercial Pea Protein A [1] | B. Original Pea slurry [2] (UHT-No antioxidants-No UF) | C. Pea Protein Base [3] (UHT + Antioxidants + UF) |
|---|---|---|---|
| Total Solid (%) | ~10% | ~3.00% | ~10% |
| Hexanal (ppb) | 641.10a | 329.02b | 70.78c |

Note:
Mean values of triplicate. Compound means in rows followed by different numerals are significantly different (p < 0.05)

Example 3: Validation of Inventive Process on Off-Flavor and Off-Color Improvement A protein base composition described herein was further tested against multiple commercially available pea protein concentrates having good consumer acceptance (in internal tests). The quality improvement by the inventive process using the combination of UHT with antioxidants is illustrated in Tables 3 and Table 4 below. Again, the results indicated that the presently-disclosed extraction methods significantly reduced off-flavor production, as expressed by the marker hexanal content, as compared with commercial pea protein powder slurries.

The color of food products is often defined using the Hunter "Lab" color space system developed, which is based on a three-dimensional color scheme (hunterlab.com). The Lab color space is a color-opponent space with dimensions L for lightness and a and b for color-opponent dimensions, based on nonlinearly compressed components. Neutral colors may be defined as those colors having low a* and b* values, e.g., the absolute values of those dimensions close to zero. The maximum Hunter colorimeter L* value is 100 (white), the minimum L* value is zero (dark) Positive a* value mean red, negative a* value equals green.

The present methods may facilitate the suppression of molecules which provide the protein base with certain colors. Overall, the pea protein base produced according to the present methods has a higher L* whiteness (less browning) and lower a* orange/red off-color as compared with the external pea protein sources.

The results demonstrate that the presently-disclosed extraction methods improved the brown and orange/red off-color, as compared with the commercial pea protein powder products.

TABLE 3

Off-Color and Off-Flavor Comparison of Commercial Available Pea Protein Powder Products vs Invention Pea Protein Base at ~7.5% Total Solid.

| Protein Source | Color (L*a*b*) [1] | Off-Flavor (hexanal ppb) | Protein/Total Solid (%) |
|---|---|---|---|
| Commercial Pea Protein A | 80.27*2.86*21.28 | 567.70 | 79% |
| Commercial Pea Protein B | 67.76*3.79*18.21 | 145.65 | 81% |
| Commercial Pea Protein C | 67.73*2.44*15.67 | ND | 70% |
| Invention protein base composition | 80.40*1.05*23.68 | 49.66 | 79% |

Notes:
1. L* 100 = white; 0 = dark; a*: positive value = red, negative value = green; b* positive value = yellow; negative value = blue; ND: not determined.
2. The external pea protein product was bought as powder and mixed with water to make slurry.

Example 4: Plant-Base Milk Prototype

Color (appearance) and flavor of food products are important considerations for consumers. Table 4 below further validated the off-flavor and off-color reduction conclusion shown in Table 3 when plant-based dairy-alternative milk prototypes (8 gram protein per serving) were made from a protein base composition produced according to the present methods and the consumer-preferred "commercial pea protein product A" as well as compared with "commercially-available pea protein milk product X."

The milk prototype made from invention pea protein gave the least off-flavor hexanal content, the highest L* whiteness value (the least brown color) and the least a* value (the least red/orange color). Their b* value (yellow color) are comparable.

TABLE 4

Off-Color and Off-Flavor Comparison of Milk Prototypes (8 grams protein per serving) from Commercial Pea Protein A and Internal Pea Protein Base as compared with Commercial Pea Protein Milk Product X.

| | Color (L*a*b* values) | Off-flavor marker (hexanal ppb) |
|---|---|---|
| "Commercial pea protein A" | 83.60*0.53*15.69 | 40.50 |
| "Commercial pea protein milk product X" | 81.57*1.25*16.90 | 93.31 |
| Plant-based dairy-alternative milk prototype produced using pea protein base prepared according to the disclosure | 85.77*0.31*16.26 | 11.85 |

Figure 1:
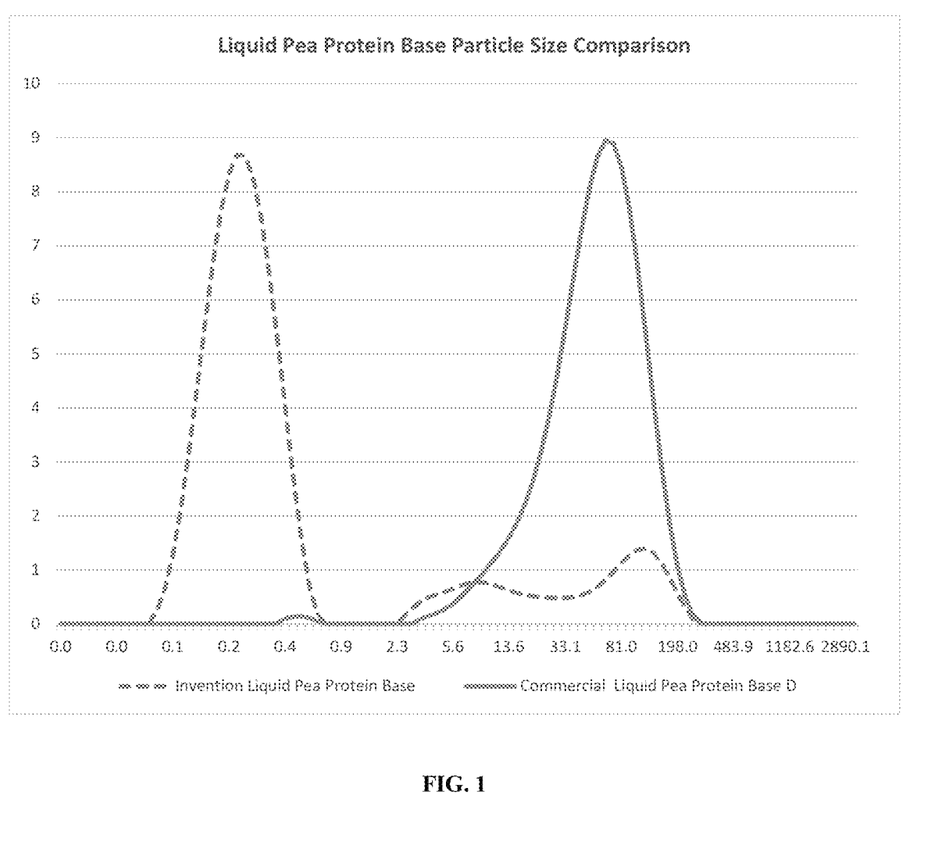
FIG. 1 illustrates a particle size comparison between Commercially available product D liquid pea protein base vs. Invention pea protein base.
Figure 2:
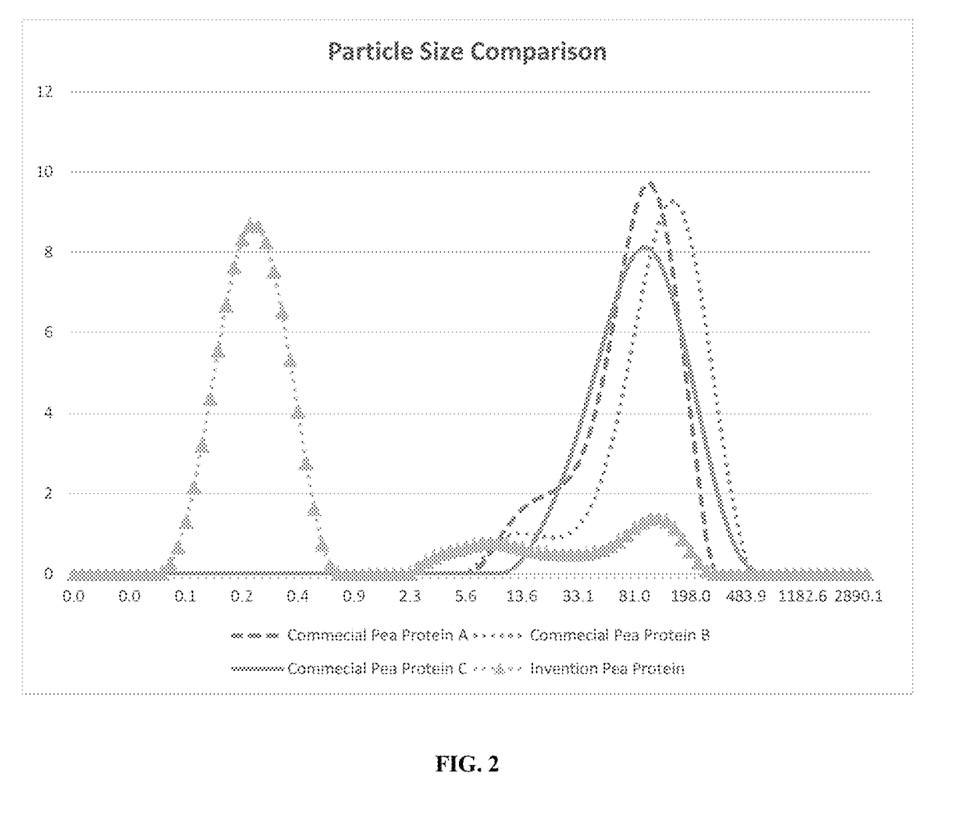
FIG. 2 illustrates a particle size comparison between external vendor powder aqueous solution vs. invention liquid pea protein base.
Figure 3:
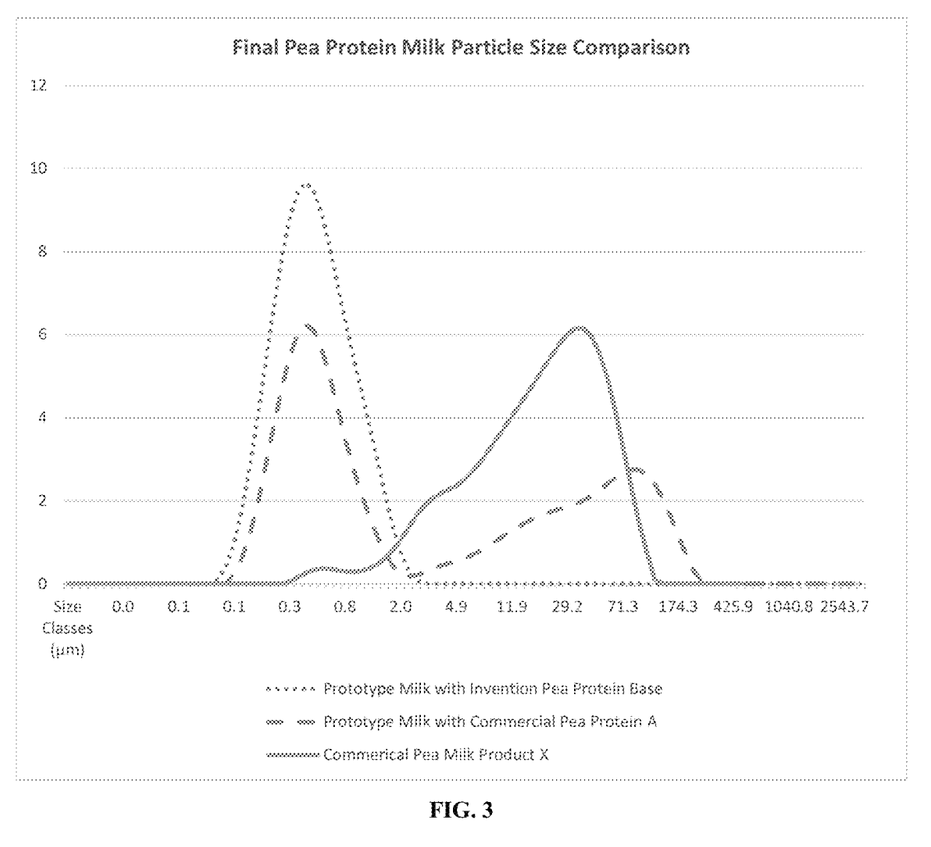
FIG. 3 illustrates a particle size comparison of milk prototypes (8 grams protein per serving) from "Commercial Pea Protein A" and an exemplary "Invention Pea Protein Base" as compared with "Commercial Pea Protein Milk Product X."

Example 5: Effect of Inventive Methods on Particle Size in Protein Base Composition and Plant-Based Milks The results in FIG. 1, FIG. 2, and FIG. 3 illustrate the effect of the minimal processing steps of the inventive method of Example 1 on protein denaturation/aggregation, as indicated by the particle size distribution.

The particle size analysis graph and data were obtained using a Mastersizer 3000 analyzer. The inventive process approaches including "cold" extraction and "cold" UF as well as UHT coupled with antioxidants significantly reduce the particle size of the invention pea protein as compared with the commercially available pea protein products. Commercially available pea protein concentrates are typically made using low pH/pI and/or salt out precipitation approaches, but precipitation techniques generally denature protein, as shown by the liquid protein base composition comparison in FIG. 2 and Table 5.

The invention pea protein base with particle size peaked at about 0.3p m vs 68 μm for commercially available products. Commercially available product «D» liquid pea protein base total particle size: ≤1 μm 0.58%; ≤10 μm 5.88%. Invention liquid pea protein base total particle size: ≤1 μm 94.5%; ≤10 μm 100%. Spray drying likely further caused protein aggregation, as indicated in FIG. 3 below by comparing to commercially available pea protein concentrates/isolates which peaked from 105 to 150 μm.

TABLE 5

| Pea Protein Source | Total Particle Size ≤1 μm | Total Particle Size ≤10 μm |
|---|---|---|
| Commercial Pea Protein A | 0% | 2.83% |
| Commercial Pea Protein B | 0% | 2.91% |
| Commercial Pea Protein C | 0% | 0.03% |
| Invention Liquid Pea Protein | 94.5% | 100% |

The finer particle sizes in the two prototype milk samples (FIG. 3) most probably was due to high shear of the commercial pea protein powder and invention liquid pea protein bases during processing. FIG. 3 also showed that the particle size profile of the commercial pea protein milk X was the coarsest/worst.

Prototype milk from commercial pea protein A total particle size: ≤1 μm 62.8%

Commercial pea protein milk product X total particle size: ≤1 μm 38.4%

Prototype from the invention pea protein total particle size: ≤1 μm 100%

Example 6: Sensory Evaluation Feedback and Micro Test Results of Milk Prototypes Sensory Test of Prototype from Pea Protein: Twenty panelists tasted the milk prototypes listed above (2 prototypes; 1 commercially available milk). Overall, the milk prototype samples made from the invention protein base composition tasted "cleaner" in terms of eggy, earthy, beany off-flavor and bitter/astringent off-taste than the prototype made from commercial pea protein concentrate A and the commercial pea protein milk product X, the invention protein base composition prototype also had less tongue coating mouthfeel. The control milk prototype made from commercial pea protein concentrate A also looked greyish, the commercial pea protein milk product X sometimes also tasted sour and bitter.

Sensory Test of Prototype from Chickpea Protein: Chickpea protein base was made using the same processes as pea protein base of Example 1.

Milk prototypes (8 gram protein per serving) were made using the invention liquid pea protein and a commercially available chickpea protein concentrate "Y" as control (prototype A). The formula combined the invention protein base composition with filtered water, vitamin and mineral blend (calcium carbonate, Vitamin E acetate, Vitamin A palmitate, Vitamin D2), sea salt, natural flavor, sunflower lecithin, and ascorbic acid.

The invention chickpea protein milk prototype B was made without the addition of sugar and nut butter, the invention chickpea protein prototype milk C was made with added sugar and nut butter. Fifteen panelists tasted the three prototypes. The control milk prototype A made with the commercial available chickpea concentrate powder product Y also looked greyish and tasted with "hard to describe strong off-flavor" and mouthcoating off-taste. The milk prototypes B and C made from internal chickpea base with and without added sugar and nut butter tasted much "cleaner" in terms of flavor and taste.

The invention claimed is:

1. A method for preparing a protein base composition, comprising:
   i) extracting a composition comprising one or more plant proteins from a source thereof, in an aqueous solution to provide an aqueous composition;
   ii) heating the aqueous composition to a temperature of 260° F.-300° F. in the presence of one or more anti-oxidant compositions, wherein the one or more anti-oxidant compositions are at least one water soluble anti-oxidant composition and at least one lipid soluble anti-oxidant composition; and
   iii) isolating a protein-containing fraction from the aqueous composition to provide a protein base composition, optionally using ultrafiltration or microfiltration,
   wherein said method is performed without the addition of calcium salts,
   wherein the plant protein source is a pulse protein.

2. The method of claim 1, wherein the pulse protein is selected from pea and/or chickpea.

3. The method of claim 1, wherein i) and iii) are carried out at a temperature of not more than 100° F., optionally, not more than 85° F.

4. The method of claim 1, wherein ii) is carried out for a duration of time between 1-300 seconds.

5. The method of claim 1, wherein the one or more anti-oxidants is one or more vitamins.

6. The method of claim 1, wherein the one or more anti-oxidant compositions is 1% to 0.01% w/w of the total aqueous composition.

7. The method of claim 1, wherein the pH of the aqueous composition is maintained at about 6-8.

8. The method of claim 1, further comprising separating the aqueous plant protein solution from an insoluble plant protein source prior to ii).

9. The method of claim 1, further comprising formulating the protein base composition into a food or beverage composition.

10. The method of claim 1, wherein the protein base composition does not contain animal, soy, gluten, dairy matter and/or combinations thereof.

11. The method of claim 5, wherein the one or more vitamins is Vitamin C and/or Vitamin E.

12. The method of claim 1, wherein at least 80% or more particles of the protein base composition have a maximum dimension equal to or less than 1 um.

13. The method of claim 1, wherein the at least one water soluble anti-oxidant composition is Vitamin C and the at least one lipid soluble anti-oxidant composition is Vitamin E.

\* \* \* \* \*